Patented Sept. 15, 1942

2,295,560

UNITED STATES PATENT OFFICE 2,295,560

PYRIMIDINE DERIVATIVES

Gaetano F. D'Alelio and James W. Underwood, Pittsfield, Mass., assignors to General Electric Company, a corporation of New York No Drawing. Application June 18, 1941, Serial No. 398,639

12 Claims. (Cl. 260—251)

This invention relates to new chemical compounds and more particularly to pyrimidine derivatives. The invention especially is concerned with the production of new and useful pyrimidyl carbamyl-alkyl sulfides and pyrimidyl thiocarbamyl-alkyl sulfides (pyrimidyl-thio-acylamides and pyrimidyl-thio-acylthioamides).

The pyrimidine derivatives of this invention may be illustrated graphically by the following general formula:

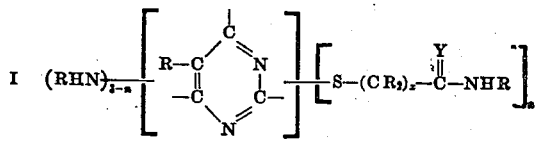

In the above formula $n$ represents an integer and is at least 1 and not more than 3, $x$ is an integer and is at least 1 and not more than 2, Y represents a member of the class consisting of oxygen and sulfur, and R represents a member of the class consisting of hydrogen and monovalent hydrocarbon and halo-hydrocarbon radicals, numerous examples of which hereafter are given. Since $x$ represents an integer which is 1 or 2, it will be seen that the linkage of the carbamyl-alkyl (or thiocarbamyl-alkyl) group to the sulfur atom in all cases will be alpha or beta to the carbamyl (—CONH$_2$) or thiocarbamyl (—CSNH$_2$) group. It also will be observed that linkage of the pyrimidyl grouping to the sulfur atom is through a carbon atom. From a consideration of the formula it further will be seen that when $n$ is 3 there will be no amino groups attached to the pyrimidine nucleus.

Illustrative examples of monovalent hydrocarbon radicals which R in the above formula may be are alkyl (e. g., methyl, ethyl, propyl, isopropyl, butyl, secondary butyl, isobutyl, amyl, isoamyl, hexyl, etc), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlormethyl, dichlorphenyl, ethyl chlorphenyl, phenyl chlorethyl, bromethyl, bromtolyl, etc. Preferably R is hydrogen.

Our new pyrimidine derivatives may be used as chemotherapeutic agents and, also, as intermediates in the preparation of other compounds. For example, they may be employed as intermediates in the preparation of derivatives thereof such as imido ether, amidine, acyl, ureido, hydrazino, etc., derivatives of the individual pyrimidyl carbamyl-alkyl (or thiocarbamyl-alkyl) sulfide. These new organic sulfides are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and are specifically claimed in our copending application Serial No. 398,638, filed concurrently herewith and assigned to the same assignee as the present invention. The aldehyde-addition products of our new pyrimidine derivatives also may be compounded with rubber, both natural and synthetic, to modify the properties of the rubber.

Various methods may be employed to produce the chemical compounds of this invention. We prefer to prepare them by effecting reaction between a mercapto pyrimidine and a mono-halogenated alkyl amide or thioamide in the presence of a hydrohalide acceptor. Illustrative examples of mercapto pyrimidines which may be used, depending upon the particular pyrimidyl carbamyl-alkyl (or thiocarbamyl-alkyl) sulfide desired, are:

4,6-diamino 2-mercapto pyrimidine
2,6-diamino 5-ethyl 4-mercapto pyrimidine
6-amino 2,4-dimercapto pyrimidine
2-amino 5-benzyl 4,6-dimercapto pyrimidine
5-methyl 2,4,6-trimercapto pyrimidine
2,4,6-trimercapto pyrimidine
4,6-di-(methylamino) 2-mercapto pyrimidine
4,6-dianilino 2-mercapto pyrimidine
2,6-di-(cyclohexylamino) 4-mercapto pyrimidine
4,6-ditoluido 5-phenyl 2-mercapto pyrimidine
4-benzylamino 6-methylamino 2-mercapto pyrimidine, which also may be named 4-methylamino 6-benzylamino 2-mercapto pyrimidine Typical examples of mono-halogenated alkyl amides and thioamides that may be employed, depending upon the particular end-product sought, are:

Chloracetamide
Chlorthioacetamide (chloracethioamide)
Alpha-chlorpropionamide
Alpha-chlorpropionthioamide
Beta-brompropionamide
Beta-brompropionthioamide
Beta-chlorbutyramide
Beta-chlorbutyrthioamide
Phenyl chloracetamide
Phenyl chloracethioamide
N-ethyl chloracethioamide
N-methyl chloracetamide
N-phenyl bromacetamide
Beta-bromo gamma-cyclohexyl butyramide
Beta-chloro gamma-phenyl butyrthioamide
Beta-chloro alpha-ethyl propionamide
Beta-chloro alpha-ethyl propionthioamide
Alpha-bromo alpha-methyl beta-chlorphenyl butyramide
Alpha-chloro alpha-ethyl beta-phenyl butyrthioamide
N-ethyl beta-chlorbutyramide
N-cyclohexyl beta-bromo alpha-propyl propionamide Illustrative examples of hydrohalide acceptors that may be used are the inorganic bases, e. g., the alkali-metal hydroxides (sodium hydroxide, potassium hydroxide, etc.), calcium hydroxide, barium hydroxide, ammonium hydroxide, etc., the carbonates of such bases, and the organic bases, e. g., tertiary amines such, for instance, as trimethyl amine, tributyl amine, dimethyl aniline, pyridine, quinoline, etc., quaternary ammonium bases (e. g., tetramethyl ammonium hydroxide, etc.), and the like. Preferably the hydrohalide acceptor is one that will react with the mercapto pyrimidine to form a water-soluble salt. Examples of such preferred acceptors are sodium and potassium hydroxides.

The reaction between the mercapto pyrimidine and the mono-halogenated alkyl amide or thioamide may be carried out in any suitable manner, but preferably is effected in the presence of a suitable solvent or mixture of solvents. Although various solvents or solvent mixtures may be employed we prefer, for economic reasons and because of their eminent suitability, to use water or a mixture of water and alcohol. The reaction may be carried out under a variety of temperature and pressure conditions, for instance at normal or at elevated temperatures and at atmospheric, sub-atmospheric or super-atmospheric pressures.

The above reaction may be represented by the following general equation:

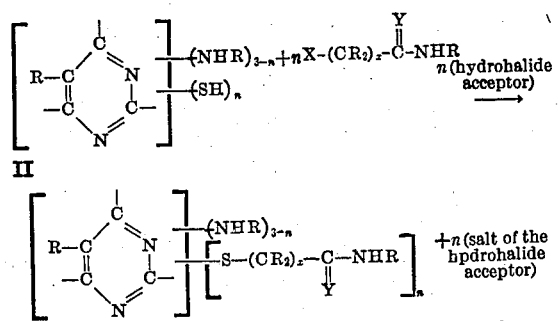

II

In the above equation X represents halogen and R, Y, $n$ and $x$ have the same meanings as given above with reference to the general Formula I for the pyrimidine derivatives of this invention.

Our new chemical compounds also may be prepared by effecting reaction between a halo-pyrimidine and a mono-mercapto alkyl amide or thioamide in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

Illustrative examples of halogenated pyrimidines which may be used, depending upon the desired end-product, are:

6-chloro 2,4-diamino pyrimidine
6-iodo 2,4-diamino pyrimidine
4,6-dichloro 2-amino pyrimidine
4,6-dichloro 5-methyl 2-amino pyrimidine
2,4,6-trichloro pyrimidine
6-chloro 2,4-di-(methylamino) pyrimidine
4-chloro 2-amino 6-anilino pyrimidine
2-chloro 4-toluido 6-ethylamino pyrimidine
4,6-dibromo 2-cyclohexylamino 5-phenyl pyrimidine
6-iodo 2,4-di-(benzylamino) 5-benzyl pyrimidine Illustrative examples of mono-mercapto alkyl amides and thioamides that may be used, depending upon the particular product desired, are:

N-methyl mercapto acetamide
N-phenyl mercapto acetamide
N-butyl alpha-mercapto beta-benzyl butyramide
Mercapto acetamide
Mercapto acethioamide
Alpha-mercapto butyramide
Alpha-mercapto butyrthioamide
Beta-mercapto alpha-phenyl propionamide
Beta-mercapto alpha-phenyl propionthioamide
Beta-mercapto beta-chlorphenyl propionamide
Beta-mercapto beta-phenyl propionthioamide
Beta-mercapto alpha-benzyl alpha-methyl butyramide
Beta-mercapto alpha-phenyl alpha-ethyl butyrthioamide
Alpha-mercapto beta-tolyl butyramide
Alpha-mercapto beta-benzyl butyrthioamide
N-cyclohexyl beta-mercapto alpha-phenyl propionthioamide The hydrohalide acceptor may be the same as described above with reference to the first-named method of preparing the compounds of this invention.

The general reaction for this alternative method of preparing our new chemical compounds is illustrated by the following equation:

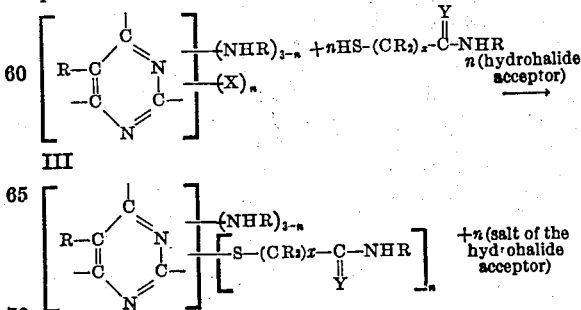

III

In this equation R, X, Y, $n$ and $x$ have the same meanings as defined hereinbefore with reference to Formula I and Equation II.

A more specific example of how these new compounds may be prepared is described below with reference to the preparation of 4,6-diamino pyrimidyl-2 carbamyl-methyl sulfide, the formula for which is IV 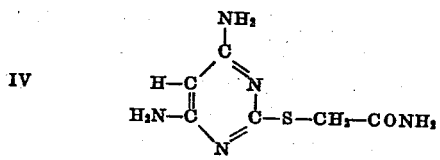

All parts are by weight.

Example

|  | Parts |
|---|---|
| 4,6-diamino 2-mercapto pyrimidine | 142.0 |
| Mono-chloracetamide (chloracetamide) | 93.5 |
| Sodium hydroxide (hydrohalide acceptor) | 40.0 |

The above ingredients were dissolved in a mixture of 1,000 parts water and 1,000 parts alcohol and allowed to react at room temperature with vigorous stirring for 4 hours, followed by heating for 1 hour on a boiling water bath. After cooling the reaction mix, the precipitated product comprising 4,6-diamino pyrimidyl-2 carbamyl-methyl sulfide was filtered off and washed well with water, followed by drying. The yield of dried product was 170 parts. No attempt was made to recover more from the mother liquor.

As will be readily understood by those skilled in the art, when it is desired to produce compounds containing a single monoamino pyrimidyl grouping and two carbamyl-alkyl sulfide groupings or compounds containing a pyrimidyl grouping and three carbamyl-alkyl sulfide groupings, then the starting reactants and proportions of reactants are chosen so as to yield the desired products in accordance with methods such as above given by way of illustration.

From the foregoing description it will be seen that the present invention provides new and useful pyrimidyl carbamyl-alkyl sulfides, examples of which are pyrimidyl tri-(carbamyl-methyl sulfide); pyrimidyl tri-(carbamyl-ethyl sulfide), pyrimidyl tri-(thiocarbamyl-methyl sulfide), pyrimidyl tri-(thiocarbamyl-ethyl sulfide), the monoamino pyrimidyl di-(carbamyl-methyl sulfides), the monoamino pyrimidyl di-(thiocarbamyl-methyl sulfides), the monoamino pyrimidyl di-(carbamyl-ethyl sulfides), the monoamino pyrimidyl di-(thiocarbamyl-ethyl sulfides), the diamino pyrimidyl mono-(carbamyl-methyl sulfides), the diamino pyrimidyl mono-(thiocarbamyl-methyl sulfides), the diamino pyrimidyl mono-(carbamyl-ethyl sulfides) and the diamino pyrimidyl mono-(thiocarbamyl-ethyl sulfides). Other and more specific examples of these new compounds are shown below:

V 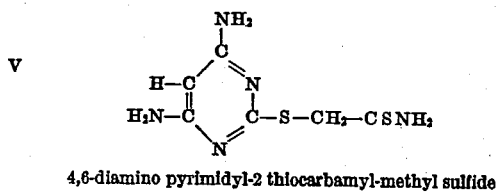

4,6-diamino pyrimidyl-2 thiocarbamyl-methyl sulfide

VI 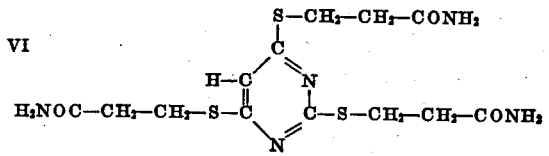

Pyrimidyl-2,4,6 tri-(beta-carbamyl-ethyl sulfide)

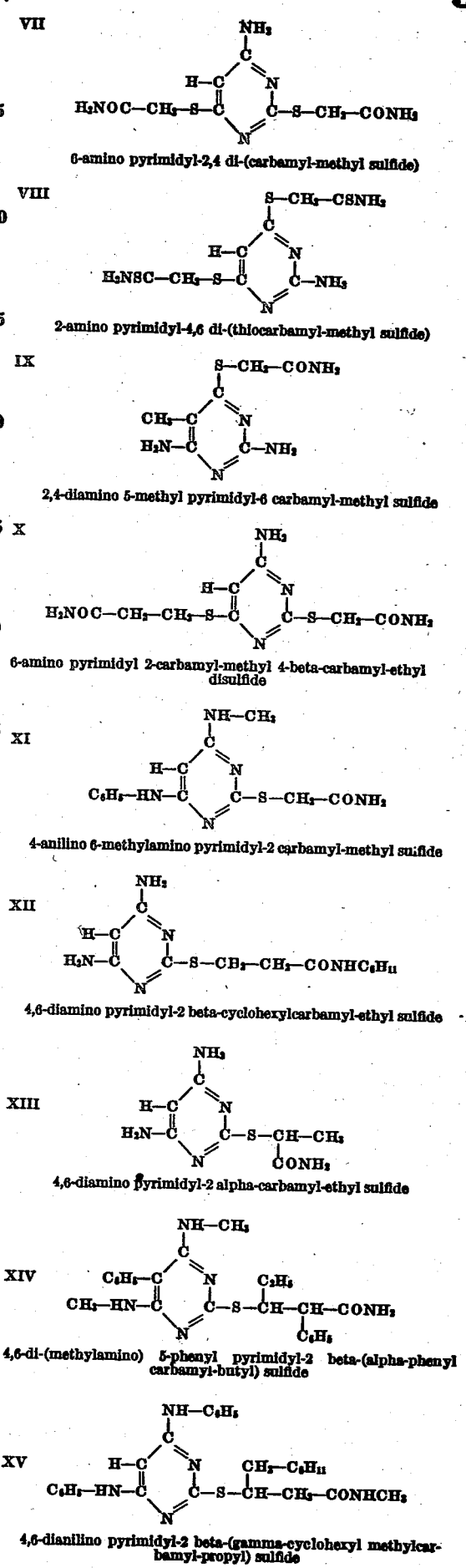

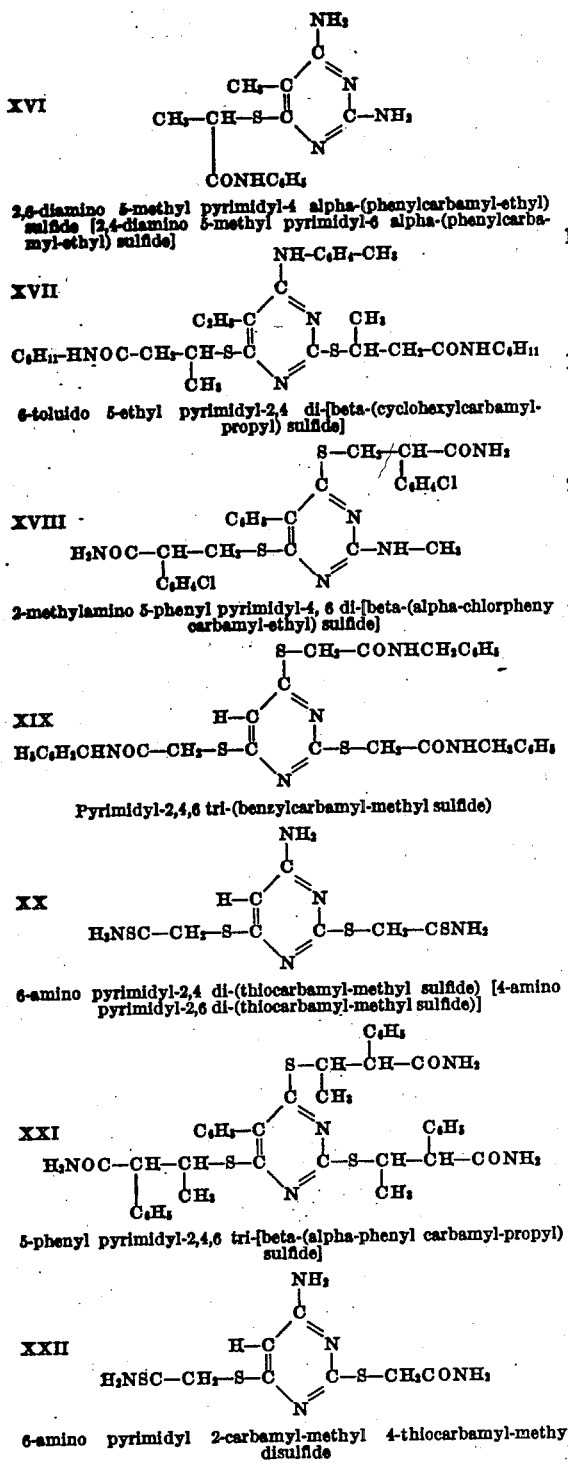

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur.

2. Chemical compounds as in claim 1 wherein R represents hydrogen.

3. Chemical compounds as in claim 1 wherein R represents hydrogen and Y represents oxygen.

4. Chemical compounds as in claim 1 wherein R represents hydrogen, Y represents oxygen and $x$ is 1.

5. Pyrimidyl-2,4,6 tri-(carbamyl-methyl sulfide).

6. A monoamino pyrimidyl di-(carbamylmethyl sulfide).

7. 6-amino pyrimidyl-2,4 di-(carbamyl-methyl sulfide).

8. A diamino pyrimidyl carbamyl-methyl sulfide.

9. 4,6-diamino pyrimidyl-2 carbamyl-methyl sulfide.

10. The method of preparing chemical compounds corresponding to the general formula

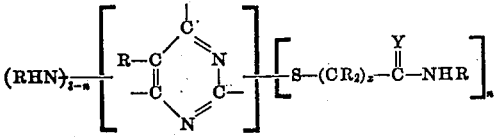

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur, said method comprising effecting reaction, in the presence of a hydrohalide acceptor, between (1) a mercapto pyrimidine corresponding to the general formula

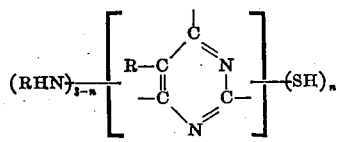

where $n$ and R have the meanings above given, and (2) mono-halogenated compound corresponding to the general formula

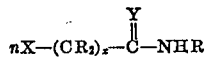

where X represents halogen and R, Y, $n$ and $x$ have the meanings above given.

11. A method as in claim 10 wherein the hydrohalide acceptor is an alkali-metal hydroxide.

12. The method of preparing 4,6-diamino pyrimidyl-2 carbamyl-methyl sulfide which comprises effecting reaction, in the presence of a hydrohalide acceptor, between 4,6-diamino 2-mercapto pyrimidine and chloracetamide.

GAETANO F. D'ALELIO.
JAMES W. UNDERWOOD.

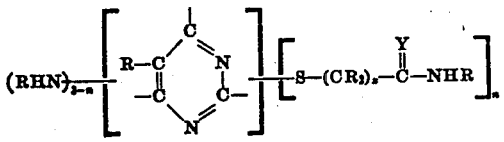

What we claim as new and desire to secure by Letters Patent of the United States is:

1. Chemical compounds corresponding to the general formula